C. H. RYAN
APPARATUS FOR HEATING SOLDERING IRONS AND THE LIKE.
APPLICATION FILED APR. 28, 1920.

1,436,461.

Patented Nov. 21, 1922.
2 SHEETS—SHEET 1.

INVENTOR
Charles H. Ryan
BY
E. C. Dean  HIS ATTORNEY

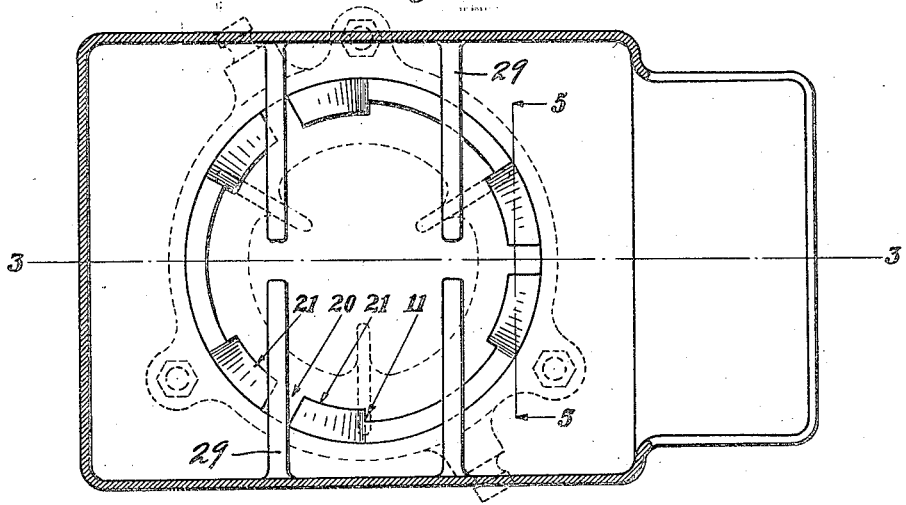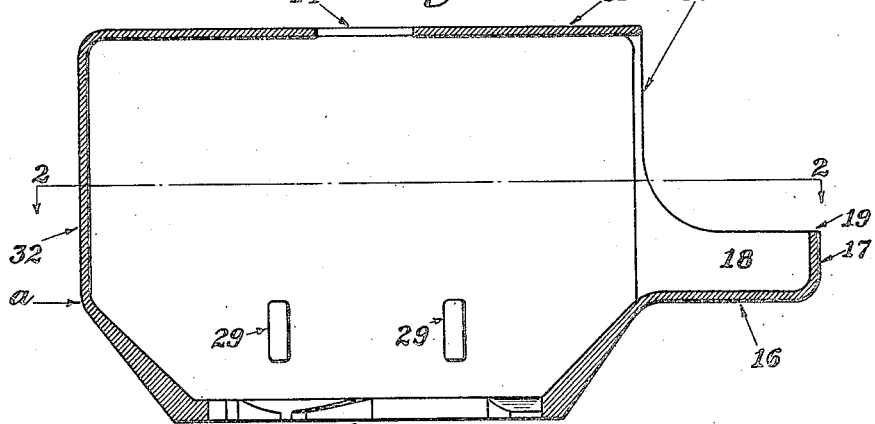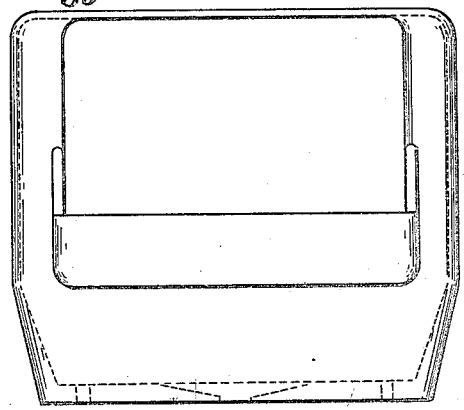

Patented Nov. 21, 1922.

1,436,461

UNITED STATES PATENT OFFICE.

CHARLES H. RYAN, OF BRONXVILLE, NEW YORK.

APPARATUS FOR HEATING SOLDERING IRONS AND THE LIKE.

Application filed April 28, 1920. Serial No. 377,357.

*To all whom it may concern:*

Be it known that I, CHARLES H. RYAN, a citizen of the United States, and resident of Bronxville, in the county of Westchester and State of New York, have invented certain new and useful Improvements in Apparatus for Heating Soldering Irons and the like, of which the following is a specification.

My present invention relates to ovens or muffles for use on gas or gasoline torches. The invention is more particularly concerned with an oven structure which will permit ready insertion and removal of the solder iron, furnish an adequate support for the solder iron head when in place, confine the heat for effectively raising the temperature of said head, and at the same time prevent the handles of the soldering irons from becoming overheated or burned. In a preferred form of the device this oven is provided with a roof and an open hearth below the roof and projecting beyond an edge thereof and preferably serving as a support for the solder iron handles.

The opening or openings through which the handles of the soldering iron project are formed and arranged so that such portion of the hot draft as escapes by way of the hearth flows upwardly away from the said support and hence out of heating relation to the handles of the soldering iron. The area and locations of these openings may be such that under normal conditions most of the draft will escape through a draft opening formed in the roof of the oven rather than through the lateral opening for the soldering irons, but heat escaping through the latter will be carried by the draft above mentioned away from the handles.

As a feature of the invention the structure of the oven may include a slot and wedge formation whereby the oven may be instantly applied to and rigidly locked upon torch stands of known construction and in common use.

A desirable embodiment of my invention and a suitable torch in connection with which it is particularly adapted for use are shown in the accompanying drawings, in which—

Fig. 2 is a horizontal section on the line 2—2, Fig. 1;

Fig. 3 is a vertical central section of the oven on the line 3—3, Fig. 2;

Fig. 4 is a front elevation of the oven; and

Figure 1:
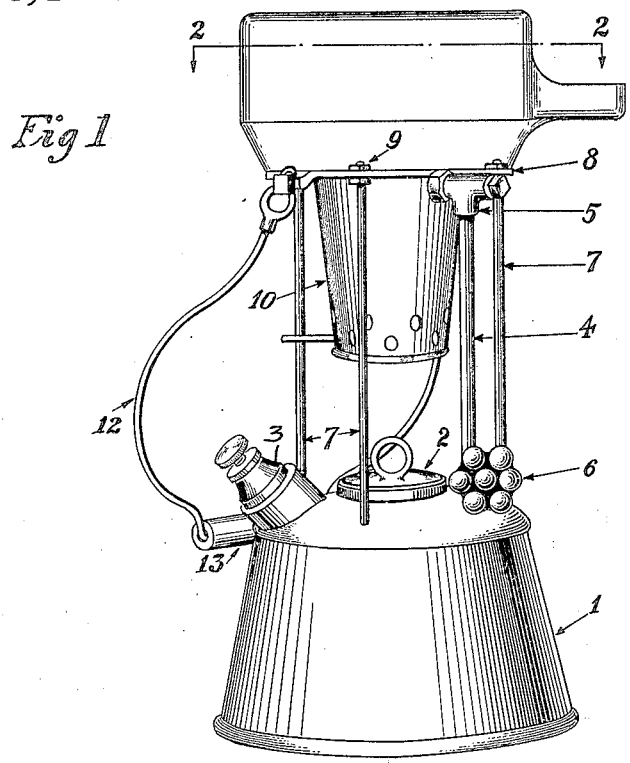
Fig. 1 is a side elevation of the torch and oven in assembled relation.
Figure 5:
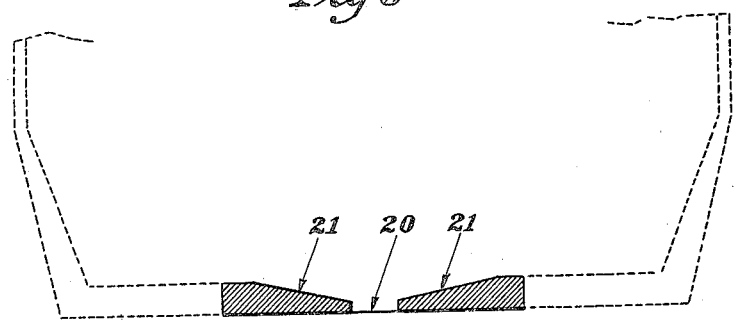
Fig. 5 is a detail section on the line 5—5, Fig. 2.

As shown in the drawings, the torch is of standard commercial construction and comprises an air tight vessel 1 for holding gasoline which may be supplied through closure 2 and put under pressure by pump 3, for feeding through pipe 4 and burner fitting 5 controlled by valve 6. Permanently attached to the vessel 1 are upright rods 7, 7, 7 having a support ring 8 secured on the upper ends thereof by nuts 9, 9, said ring carrying the usual chimney 10 of the burner. The ring support 8 is provided with L-shaped lugs 11 preferably three in number. The whole structure is provided with an ordinary swinging bale 12 having a wooden hand grip 13. The above torch structure taken by itself is old in the art and does not constitute my invention.

The oven is indicated in the drawings as being an integral metal casting but certain features of the invention could be embodied in a structure formed of other materials, as for instance, sheet metal.

The exterior form and proportions of the oven are indicated in Fig. 1, the interior construction and arrangement for support of the soldering irons are indicated in the remaining figures.

The body portion of the oven above the level a, Fig. 3, comprises a rectangular roof 31 and side walls 32. The height of this portion of the oven is preferably less than twice the thickness of the largest standard size soldering irons now in use, and the width is preferably sufficient to comfortably support two irons side by side. The length or depth of the oven should in general be less than twice the length of the soldering head.

The roof has the draft opening 14 for the escape of heated gases and the front opening 15 is peculiarly formed to minimize escape of heated air, by providing a projecting hearth comprising a horizontal portion 16 and an upstanding portion 17 closed in by sides 18 constituting a rim for the hearth, the upper edge 19 of portion 17 acting as a support for the soldering iron handles.

The hearth thus formed being normally in a more or less continuous natural draft due to exteriorly radiated heat of the torch, and this draft being upward, said hearth forms a substantial protection against entry of outside air into the oven even though the entrance opening 15 is of substantial area. If this opening for the insertion of the iron heads be made in the obvious way so that there is a portion of the vertical front wall extending downward from the roof to the opening, hot air flowing out through the opening 15 would be deflected downward and would be likely to overheat or burn the handles of the soldering irons, unless the draft opening 14 is made too large for economical retention of the heat within the oven. Hence one feature of my invention consists in extending the opening 15 clear up to the roof so that there is no downwardly projecting front wall to direct the hot air onto the handles. The above described construction and arrangement of the hearth minimizing draft of air into the opening 15 naturally tends to minimize escape of air from said opening. Thus my construction omits the front wall of the portion of the oven above the level indicated by $a$ in Fig. 3.

With the above arrangement substantially the minimum necessary amount of hot air will be permitted to escape and substantially all of the escaping air will be that which entered the torch through the chimney 10 thus bringing about efficient combustion of the gasoline or other liquid fuel. The draft of the torch will find its escape upward through opening 14 and upward from the uppermost portion of opening 15. The total amount escaping from both points taken together will, of course, be substantially the amount required for the torch draft, augmented not at all or but little by any outside air finding its way through the lower part of opening 15. Moreover, such part of the draft as does escape through the upper part of opening 15 will flow outward and upward entirely out of range of heating action on the handles of the soldering irons, which as above noted is not the case where any attempt is made to prevent escape of the draft at this point by partial closing in this part of the opening 15.

Below the level of point $a$, Fig. 3, the oven sharply contracts at the corners to approximately circular form framing in the opening 30 for inlet of the torch flame to the oven. The inner periphery of this opening is formed with a circular ledge having radial slots 20 and adjacent wedge surfaces 21 adapted to engage the under sides of the L-shaped lugs 11 on the ring support 8 when the oven is rotated through a small angle, after insertion of said lugs into said radial slots.

Where the oven is made as an integral casting, the internal supports 29, 29 for the head of the soldering irons are formed as oppositely projecting aligned lugs having their free ends slightly separated. This is a desirable provision since if the supports were cast as bars extending continuously across the oven, the expansion and shrinkage both in casting and in the use of the device might impose dangerous strains on the material. When the oven is of sheet metal, this precaution will of course not be so important. Nevertheless, of whatever material these supports are made, the upper surfaces thereof on which the soldering iron heads bear should be a substantial distance, say one inch and a half above the level of the support ring, to dispose the head directly in the hottest part of the flame. The supports are preferably separated from each other a distance less than the length of a medium soldering head so that the massive portion of the head is directly exposed to the flame.

The exterior hearth support 19 for the shank of the soldering iron is preferably on a slightly higher level equal to about half the diameter of a soldering head so that the normal position of the soldering iron is horizontal.

I claim:—

1. An attachment for portable gaseous fuel furnaces comprising an integral oven structure having a base, a rectangular roof having a draft opening and a wall connecting three sides of said roof to said base, leaving the fourth side open for the insertion of a solder iron head with the handle projecting, and an integral hearth projecting from said vessel near said base, and also serving as a rest for the projecting handle.

2. The combination of claim 1, in which the hearth has an upstanding rim for supporting the solder iron handle.

3. An oven for heating soldering irons and the like, comprising a vessel having a circular base, a rectangular roof of dimension larger than the base diameter, vertical walls extending from three sides of said roof, the fourth side being open, oblique wall portions encircling said circular base and connecting said three vertical portions thereto, and an integral hearth projecting from said oblique wall portion at the lower edge of said open side, said hearth having an upstanding rim.

4. The combination of claim 3 in which integral supporting lugs extend transversely of the vessel, and partially thereacross for supporting soldering irons, the elevation of said lugs being such that the soldering iron can be substantially horizontally disposed when the head of said iron rests on said lugs and the handle on the rim of said hearth.

5. An oven for heating soldering irons and the like, comprising a vessel having a circular base, a rectangular roof of dimension larger than the base diameter, vertical walls extending from three sides of said roof, the fourth side being open, oblique wall portions encircling said circular base and connecting said three vertical portions thereto, an integral hearth projecting from said oblique wall portion at the lower edge of said open side, said hearth having an upstanding rim, said base comprising a rim encircling a central opening for passage of a torch flame, said rim being slotted for ready securing to a torch stand.

Signed at Bronxville, in the county of Westchester and State of New York, this 24th day of April, A. D. 1920.

CHARLES H. RYAN.